(12) United States Patent
Barker et al.

(10) Patent No.: US 9,020,206 B2
(45) Date of Patent: Apr. 28, 2015

(54) METHOD FOR DETERMINING THE CLEANING EFFECTIVENESS OF TOILET PAPER

(71) Applicant: The Proctor & Gamble Company, Cincinnati, OH (US)

(72) Inventors: Matthew Lloyd Barker, Mason, OH (US); Marlene Otero, Cincinnati, OH (US); David Warren Loebker, Cincinnati, OH (US); Ashley Lynn Kuntz, Cincinnati, OH (US); John Michael Dunavent, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 49 days.

(21) Appl. No.: 13/965,259

(22) Filed: Aug. 13, 2013

(65) Prior Publication Data

US 2015/0049920 A1 Feb. 19, 2015

(51) Int. Cl.
*G06K 9/00* (2006.01)
*G06T 7/40* (2006.01)

(52) U.S. Cl.
CPC ...................................... *G06T 7/408* (2013.01)

(58) Field of Classification Search
USPC ......... 382/100, 103, 108, 111, 181, 190, 195; 356/237.1, 238.1; 700/130–144; 348/135
See application file for complete search history.

(56) References Cited

U.S. PATENT DOCUMENTS

| | | | |
|---|---|---|---|
| 6,587,575 B1* | 7/2003 | Windham et al. | 382/110 |
| 6,913,929 B1* | 7/2005 | Da Silva | 436/63 |
| 7,772,455 B1* | 8/2010 | Roe et al. | 604/360 |
| 7,787,111 B2* | 8/2010 | Kim et al. | 356/73 |
| 8,073,212 B2* | 12/2011 | Gerlach et al. | 382/128 |
| 2003/0135185 A1* | 7/2003 | Crowther | 604/385.01 |
| 2004/0085443 A1* | 5/2004 | Kallioniemi et al. | 348/135 |
| 2009/0264847 A1* | 10/2009 | Ashton et al. | 604/367 |
| 2010/0274209 A1* | 10/2010 | Roe et al. | 604/378 |
| 2011/0058717 A1 | 3/2011 | Dunavent et al. | |

OTHER PUBLICATIONS

Hernández Guerrero, et al., "Professional whitening strips in a university population", *American Journal of Dentistry*, vol. 20, pp. 15A-18A, Sep. 2007.

(Continued)

*Primary Examiner* — Anand Bhatnagar
(74) *Attorney, Agent, or Firm* — Roddy M. Bullock (57) ABSTRACT

A method for determining the effective cleaning of bath tissue. The method can include providing at least one pair of worn underwear; optionally, cutting the pair of worn underwear and laying it flat with the inside surface exposed; scanning an image of the exposed, inside surface of the underwear, the image including at least a portion of the underwear likely to have fecal staining; capturing with the image at least one color standard; selecting image points in areas of the scanned image visually appearing clean and areas of the scanned image visually appearing stained with fecal staining; optionally, converting the Red, Green, Blue (RGB) color to L*a*b* color values; utilizing analysis software to characterize other areas of the scanned image corresponding to image points having similar color to the image points selected as clean or stained with fecal staining; classifying the entire image, pixel by pixel, into defined portions of the underwear that are clean or stained with fecal staining; and, calculating areas corresponding to portions of the underwear stained with fecal staining.

10 Claims, 8 Drawing Sheets

(56) References Cited

OTHER PUBLICATIONS

Ferrari, et al., "Daytime use of a custom bleaching tray or whitening strips: Initial and sustained color improvement", *American Journal of Dentistry*, vol. 20, pp. 19A-22A, Sep. 2007.

Bizhang, et al., "Clinical trial of long-term color stability of hydrogen peroxide strips and sodium percarbonate film", *American Journal of Dentistry*, vol. 20, pp. 23A-27A, Sep. 2007.

Yudhira, et al., "Clinical trial of tooth whitening with 6% hydrogen peroxide whitening strips and two whitening dentrifices", *American Journal of Dentistry*, vol. 20, pp. 36A-18A, Sep. 2007.

* cited by examiner

METHOD FOR DETERMINING THE CLEANING EFFECTIVENESS OF TOILET PAPER

FIELD OF THE INVENTION

The present disclosure relates to methods for determining the presence of staining on articles, such as undergarments.

BACKGROUND

Bath tissue, also known as toilet paper, is widely used for post urination and post bowel movement cleaning. The cleaning effectiveness of bath tissue depends on properties such as strength and texture. Some bath tissues are more effective at cleaning than others, with the result being that some people are cleaner than others after, for example, wiping themselves after a bowel movement.

A practical result of poor cleaning effectiveness of bath tissue can be the visible staining of undergarments. If a bath tissue product cleans completely, the user's undergarments will more likely be clean after a certain time of wearing post-cleaning. Likewise, if a bath tissue product does not clean effectively, the user's undergarment will show visible staining caused by, for example, fecal material that is transferred from the user's body to the undergarment, commonly referred as skid marks.

A manufacturer of bath tissue can design bath tissue to be more effective at cleaning. If a manufacturer does design such a bath tissue, the result should be cleaner undergarments of the users of the bath tissue. If the undergarments could be inspected and compared to undergarments of a different bath tissue, the comparison could be used to show one bath tissue is better at cleaning than the other.

Accordingly, there is an unmet need for a method to show the cleaning effectiveness of bath tissue.

SUMMARY

A method for determining the effective cleaning of bath tissue is disclosed. The method can include providing at least one pair of worn underwear; optionally, cutting the pair of worn underwear and laying it flat with the inside surface exposed; scanning an image of the exposed, inside surface of the underwear, the image including at least a portion of the underwear likely to have fecal staining; capturing with the image at least one color standard; selecting image points in areas of the scanned image visually appearing clean and areas of the scanned image visually appearing stained with fecal staining; optionally, converting the Red, Green, Blue (RGB) color to L*a*b* color values; utilizing analysis software to characterize other areas of the scanned image corresponding to image points having similar color to the image points selected as clean or stained with fecal staining; classifying the entire image, pixel by pixel, into defined portions of the underwear that are clean or stained with fecal staining; and, calculating areas corresponding to portions of the underwear stained with fecal staining.

BRIEF DESCRIPTION OF THE DRAWINGS

The above-mentioned and other features and advantages of this disclosure, and the manner of attaining them, will become more apparent and the disclosure itself will be better understood by reference to the following description of non-limiting embodiments of the disclosure taken in conjunction with the accompanying drawings, wherein.

DETAILED DESCRIPTION

Various non-limiting embodiments of the present disclosure will now be described to provide an overall understanding of the principles of the method of the invention. The features illustrated or described in connection with one non-limiting embodiment can be combined with the features of other non-limiting embodiments. Such modifications and variations are intended to be included within the scope of this disclosure.

The present invention utilizes imaging and analysis technology to quantify color differences on a material, such as woven fabrics, nonwoven fabrics, tissues, and the like. For example, the invention could be utilized to characterize staining in baby diapers, wet wipes, feminine hygiene products, clothing, and the like.

In a nonlimiting embodiment, the invention will be described as a method for analyzing and characterizing the area of fecal staining in articles, such as undergarments, after wearing. In this embodiment, the term "stain" is used to refer to fecal staining. The area of fecal staining can be an indication of cleaning effectiveness of bath tissue. After a bowel movement, bath tissue is used to clean the anal and peri-anal area of a user. If the anal or peri-anal area is cleaned completely, the undergarment of the user should show little to no staining due to the lack of transfer of fecal matter from the body to the undergarment. Conversely, if the bath tissue fails to clean completely, some fecal matter will be left behind, so to speak, and can transfer to the undergarment. Depending on the amount of fecal matter transferred to the undergarment, a stain of a measurable area can appear on the undergarment.

In an embodiment of the present invention, a user who wears white undergarments, sometimes referred to as "tighty whities," can use two different brands of bath tissues alternately in his normal routine of bowel movements and wiping. For example, the user can use a first brand of bath tissue over a first number of days and with a first number of pairs of underwear, and then use a second brand of bath tissue over a second number of days and with a second number of pairs of underwear. The user can then compare the pairs of underwear to visually determine which ones have a larger, more visible stain from fecal matter. Likewise, a user could use a single pair of underwear worn at two time periods, and visually compare for fecal staining. Of course, the more effective the bath tissue at cleaning, the smaller the underwear stains and/or stain intensity will be. Conceptually, this explains the basis for the analysis of the current invention.

In an embodiment, the present invention involves providing for analysis a pair of worn, used underwear. The underwear can have been worn by a first user for a period of time, such as one day, and can have been worn after at least one bowel movement for which a first brand of bath tissue was utilized for cleaning of the anal or peri-anal area. The underwear can have a visible stain left from fecal matter the bath tissue failed to remove. The size and/or intensity of the stain on each pair of underwear can be analyzed and quantified to determine the effectiveness of the bath tissue at cleaning. Frequent, large, and/or intense stains can indicate that the bath tissue did a relatively poor job of cleaning. Few, small, and/or light stains can indicate that the bath tissue did a relatively good job of cleaning.

In an embodiment, the present invention involves providing for analysis a second pair of worn, used underwear. The underwear can have been worn by the first user over a second period of time or a second user for a first period of time, such as one day, and can have been worn after at least one bowel movement for which a second brand of bath tissue was utilized for cleaning of the anal or peri-anal area. The underwear can have a visible stain left from fecal matter the bath tissue failed to remove. As discussed above, for the second pair of underwear, and a second user, the size and/or intensity of the stain on each pair of underwear can be analyzed and quantified to determine the effectiveness of the bath tissue at cleaning. Frequent, large, and/or intense stains can indicate that the bath tissue did a relatively poor job of cleaning. Few, small, and/or light stains can indicate that the bath tissue did a relatively good job of cleaning.

In an embodiment, the cleaning effectiveness of either bath tissue can be individually determined by the method of the invention. In an embodiment, two sets of underwear, one worn by the first user with the first bath tissue, and one worn by the first user with the second bath tissue, can be evaluated by the method of the present invention, and the results compared to make a judgment as to the cleaning effectiveness of the respective brands of bath tissues used while wearing each. In an embodiment, two sets of underwear can be evaluated by the method of the present invention, one worn by the first user with the first bath tissue, and one worn by the second user with the second bath tissue, can be evaluated by the method of the present invention and the results compared to make a judgment as to the cleaning effectiveness of the respective brands of bath tissues used while wearing each. In an embodiment, the method of the present invention can be used to evaluate multiple brands of bath tissue for cleaning effectiveness. Of course, the methodology can be extended to more than two users or more than two brands of bath tissue.

In an embodiment, the first step is to provide at least one pair of clean, non-stained, underwear to users who can wear the underwear over a period of time while using a brand of bath tissue. In an embodiment the underwear can be washed or unwashed prior to being worn. In an embodiment, two users can be provided clean, non-stained, underwear, and each can wear the underwear over a period of time while using the same brand of bath tissue, or one user can use a first brand of bath tissue and a second user can use a second brand of bath tissue. In an embodiment, two users can be provided at least one pair of clean, non-stained, underwear, and each can wear the underwear over a period of time while using a first brand of bath tissue, and then each are provided a second pair(s) of clean, non-stained, underwear for wear over a period of time while using a second brand of bath tissue. In an embodiment, a plurality of users can be provided with multiple pairs of clean, non-stained underwear to be worn with a plurality of brands of bath tissue. In any embodiment, the underwear and bath tissue can be provided with instructions for use in blind testing, double blind testing, or any other suitable testing environment.

The users can return worn, used, underwear for analysis of fecal matter staining. In an embodiment, one or more pairs of underwear can be visually inspected by a human being to check for stain presence. If no fecal matter stain is visible to the human eye under normal indoor lighting, the used, worn, pair of underwear need not be analyzed further according to the present invention.

Figure 1:
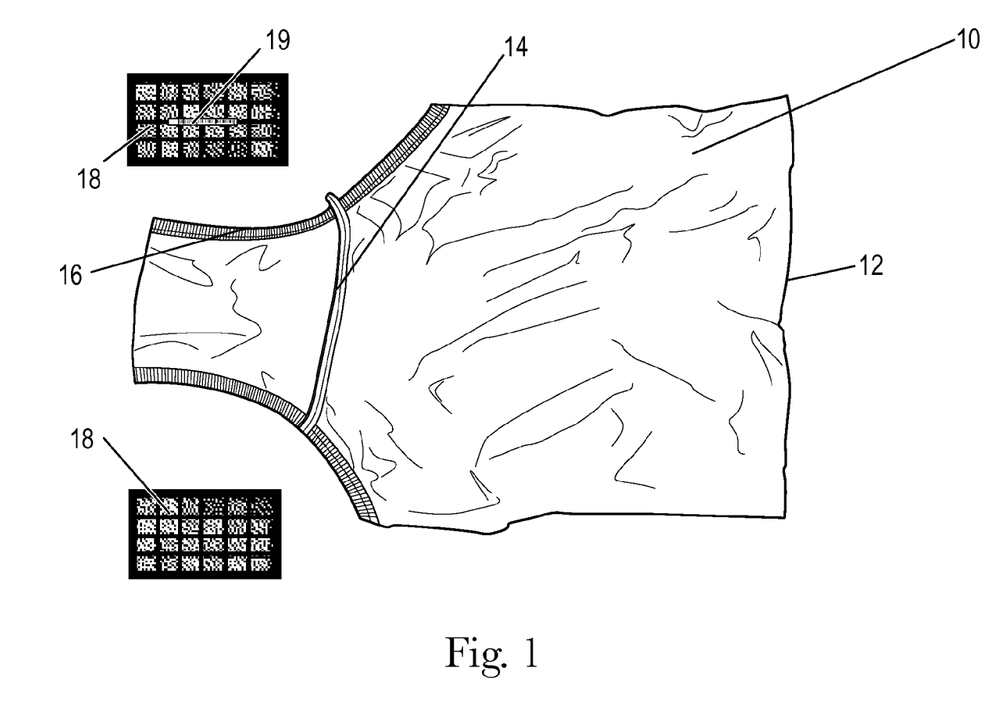
FIG. 1 is a plan view of underwear to be imaged in accordance with one embodiment of the present invention.

The analysis of the bath tissue cleaning effectiveness can continue by capturing an image of the portion of the stained underwear. In an embodiment, the image is a digital image. In an embodiment, as shown in FIG. 1, the underwear 10 (a clean pair is shown in FIG. 1) can be cut as needed to ensure it can be laid flat with the inside surface exposed upwardly for imaging. The underwear can have a waistband 12, a seam 14, and two leg openings 16. In an embodiment, the waistband 14 can be cut through at two places to the respective leg openings 16, and, optionally, the portion of the underwear not likely to have fecal stain (i.e., the portion generally worn in the front of the user) can be cut off.

Figure 2A:
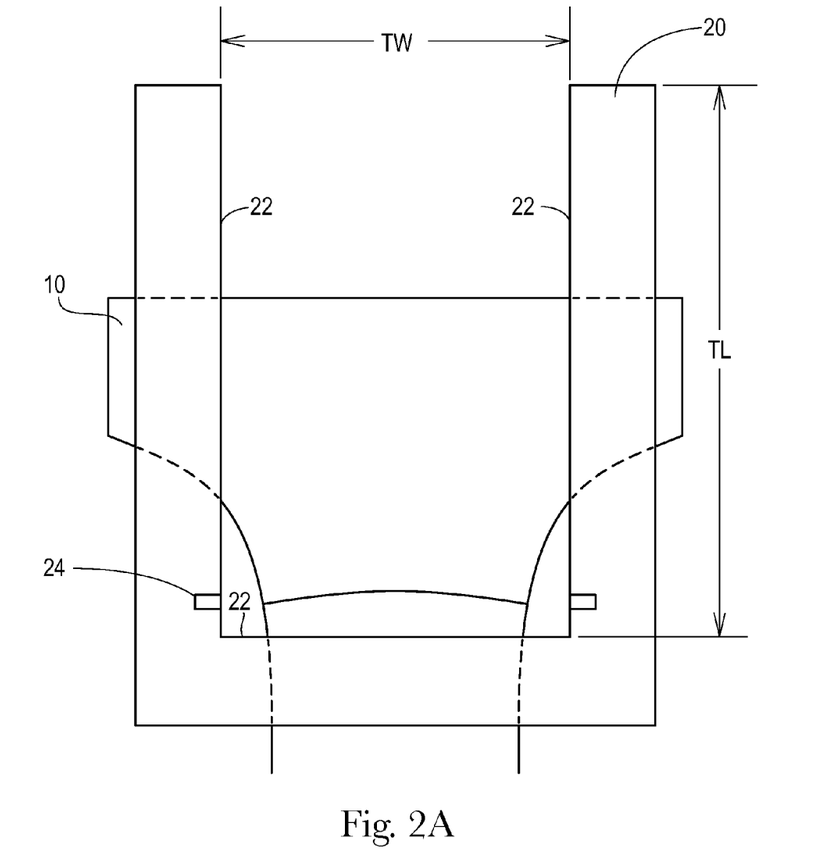
FIG. 2 is a plan view of an exemplary template useful for preparing a sample for imaging.
Figure 2B:
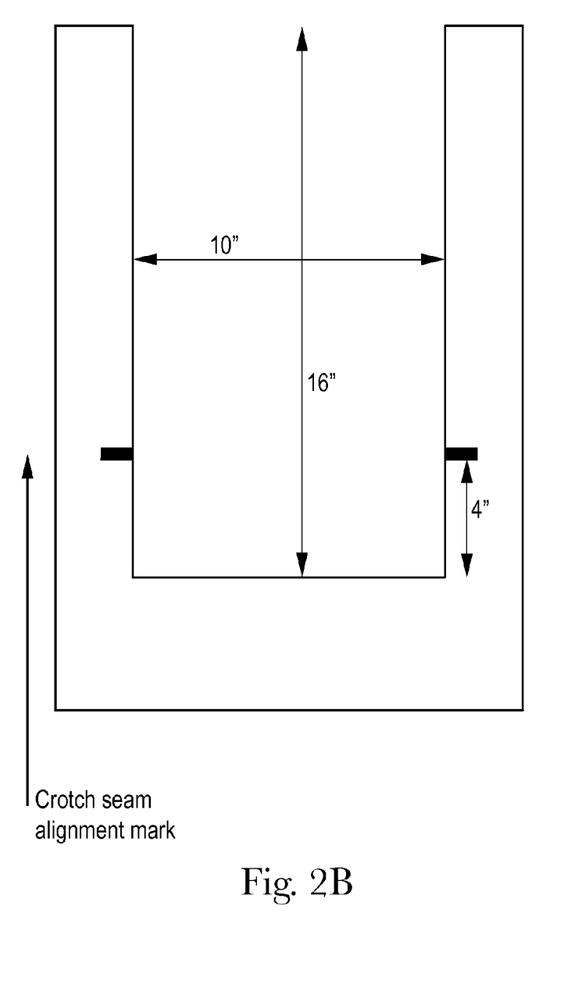

In an embodiment, a garment, such as an underwear sample can be prepared for imaging by cutting it to size in a generally uniform manner. For example, as shown in FIG. 2, the underwear can be cut to a generally uniform size and shape by use of a template, which can be made out of 1/16 inch thick PLEXIGLAS®, and prepared on a cutting mat (for example, an OLFA 9881 RM-SG), and prepared with a rotary cutting tool (for example, an OLFA 45 mm). The template 20 can have an open area defined by a template width TW and template length TL. The template 20 can be placed over the underwear 10 as indicated in FIG. 2, and the underwear cut along three cutting edges 22, as indicated in FIG. 2. In an embodiment, alignment marks 24 can be utilized to ensure consistent alignment of underwear features, such as, for example, a seam 18.

An image of the portion of underwear laid flat can be captured by any digital image capturing means. For example, in an embodiment, the image can be captured by a color scanner, such as an Epson Expression 10000XL flatbed scanner (with associated software and computer). The scanner can capture images and save them in standard RGB file formats. The scanner bed can be prepared, if necessary, by use of a glass cleaner and lint-free tissues (i.e., KIMWIPES® brand wipes).

In an embodiment, in addition to capturing an image of the underwear, the image can include in it a ruler 19 and one or more color charts 18, sometimes referred to as color standards or color palettes, comprising standard color chips for which, for example, RGB values are known. The color chips can be Munsell® color chips available from Munsell Color 4300 44th Street SE, Grand Rapids, Mich. Although the Figures of the present application are in grey scale, it is understood that the color charts can comprise a range of colors from the entire color spectrum.

RGB stands for Red, Green, Blue, and is a recognized color standard for accurately and consistently characterizing colors. Two standard RGB color charts 18 are shown in FIG. 1. A ruler 19 can be placed on the color chart 18 to facilitate measurement of the number of pixels in a centimeter, for example. The color charts allow for consistency in image color checking, and serve to ensure that colors can be identified despite differences in ambient lighting, image light quality, and the like, for example. By including known colors in color charts, the image of the underwear, including any fecal staining, can be calibrated, for example, to standard RGB colors and/or can be converted to CIE L*a*b* color values (L*a*b*) or other color charts. Analysis in accordance with the present disclosure can be accomplished with RGB color values, however, in an embodiment for more effectively analyzing fecal matter staining, the color values can be converted to CIE L*a*b* (or, simply "L*a*b*").

The conversion to L*a*b* can be important in the present invention because the inventors have surprisingly discovered that color changes along the positive b*-direction, i.e., yellowness level, can be important for accurately distinguishing the area and intensity of stains due to fecal matter on white fabric. While the fecal stain may appear brown or brownish to the naked eye, in fact, yellow is a much better indicator of stain presence and intensity, and the ability to detect and analyze yellow is important to the present invention. That is, as discussed and shown more fully below with reference to FIGS. 5-7, the stain can be distinguished from non-stain along the b-vector of the L*a*b color scale by distinguishing yellowness from a low b* value indicating whiter fabric, to a high b* value indicating yellower fabric that is soiled. In addition, non-stained areas of the underwear typically have high L* and b* near zero, however, non-stained areas may also have folds, edges, or wrinkled features on the underwear that may have lower L* (like stain) but still have b* near zero. Thus, L* by itself can be inadequate to measure stain. On the other hand, increasing b* is indicative of more intense fecal stain and is not confused with clean areas above a determined threshold. More specifically, in an embodiment, a higher positive b* value and a lower L* indicates browner/darker stains. For stained areas, as b* goes down towards zero (reduced yellowness) then L* tends to go up (lighter), this indicates yellowish/lighter stain changing to whiter color. Once distinguished, the yellowness characteristic of the imaged colors can be used to classify the stain area and/or determine the level of intensity of comparative samples of underwear having stains. The imaged, color-characterized underwear data can then be merged with bath tissue brands used when the underwear was being worn to determine which brands of bath tissue result in underwear having smaller and/or less intense fecal matter stains.

Additionally, certain artifacts of garments, such as labels or other printed matter on a waistband of underwear, can be distinguished by location. That is, a label having black or red printed matter can be noted, and in the analysis ensure that pixels from the location of the label are removed from the analysis. For example, in the embodiment shown in FIG. 1, the analysis can discard any black pixels or red pixels that are detected more than, for example, 850 pixel columns to the right.

Figure 3:
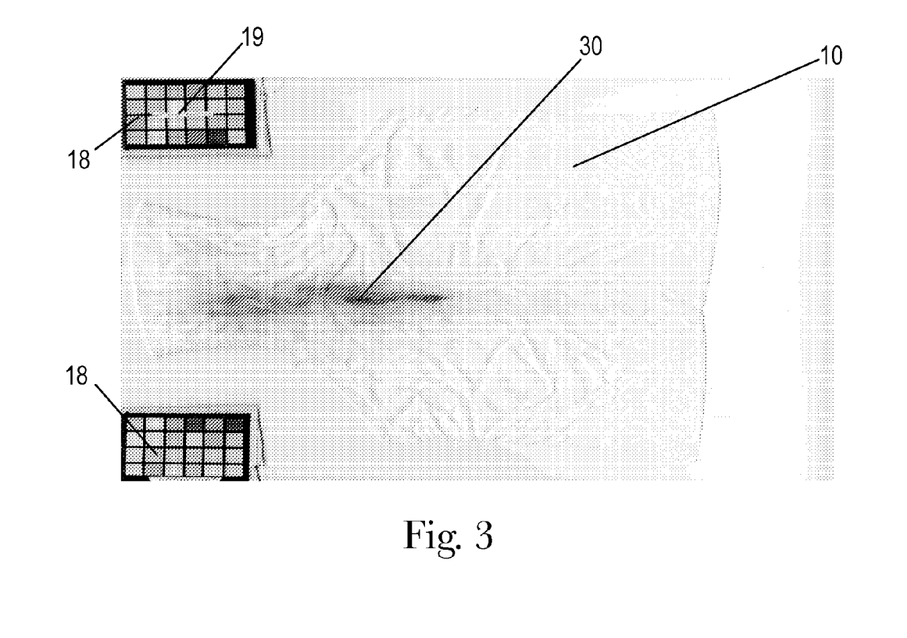
FIG. 3 is a plan view of underwear to be imaged in accordance with one embodiment of the present invention.

FIG. 3 shows a pair of underwear 10 cut and laid flat for imaging, the underwear having a fecal matter stain 30. In the embodiment shown in FIG. 3, the waistband of the underwear 10 has been cut completely off so as to eliminate any color detection associated with the label (as shown in FIG. 1). Color charts 18 are present, the color charts having a range of RGB colors. The RGB colors of the color charts 18 permit color calibration, which can be important for color conversion and/or to detect whether the scanner color has systematically changed over time due to such things as lighting variations.

Figure 4:
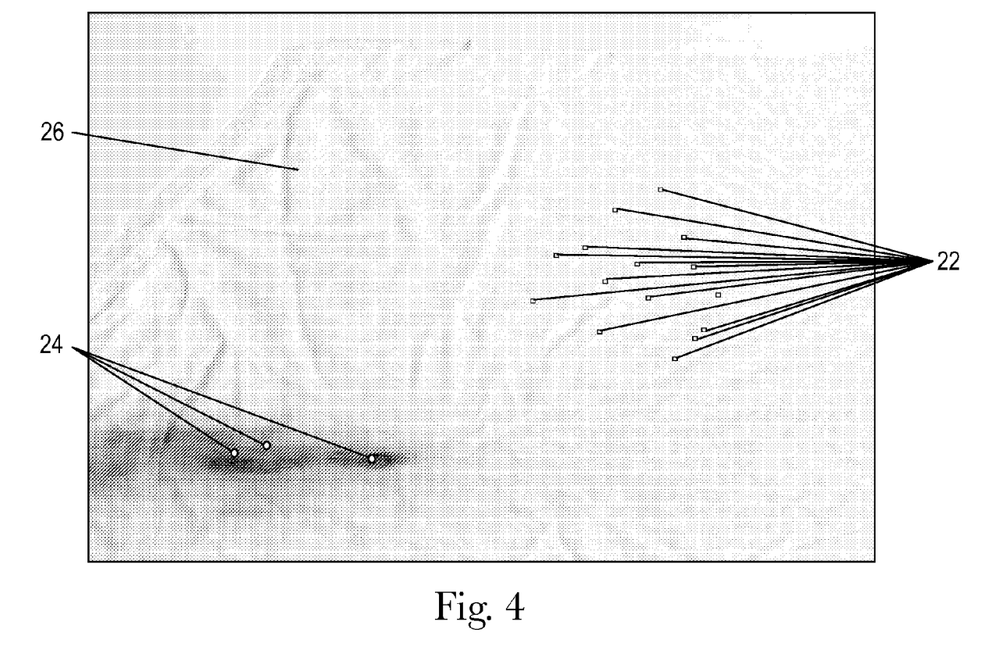
FIG. 4 is a plan view of underwear to be imaged in accordance with one embodiment of the present invention.

FIG. 4 shows that once the image is captured, an operator can manually select image points corresponding to visibly clean portions 22 of the underwear and visibly stained portions 24 of the underwear. Image points corresponding to anomalies such as shadows 26 due to folds and wrinkles (or waistband labels, and the like) can also be selected. Once the various image points and corresponding color values are identified and classified (also known as a training set), a mathematical or statistical calculation of these color data with known categories may be used to predict the likelihood or other score that an unclassified pixel belongs to each category of interest (e.g., fecal stain or clean underwear). Further, the entire image can be color-characterized, pixel by pixel, to classify each pixel into either a color corresponding to a fecal stain, or a color corresponding to a non-fecal stained portion.

Figure 5:
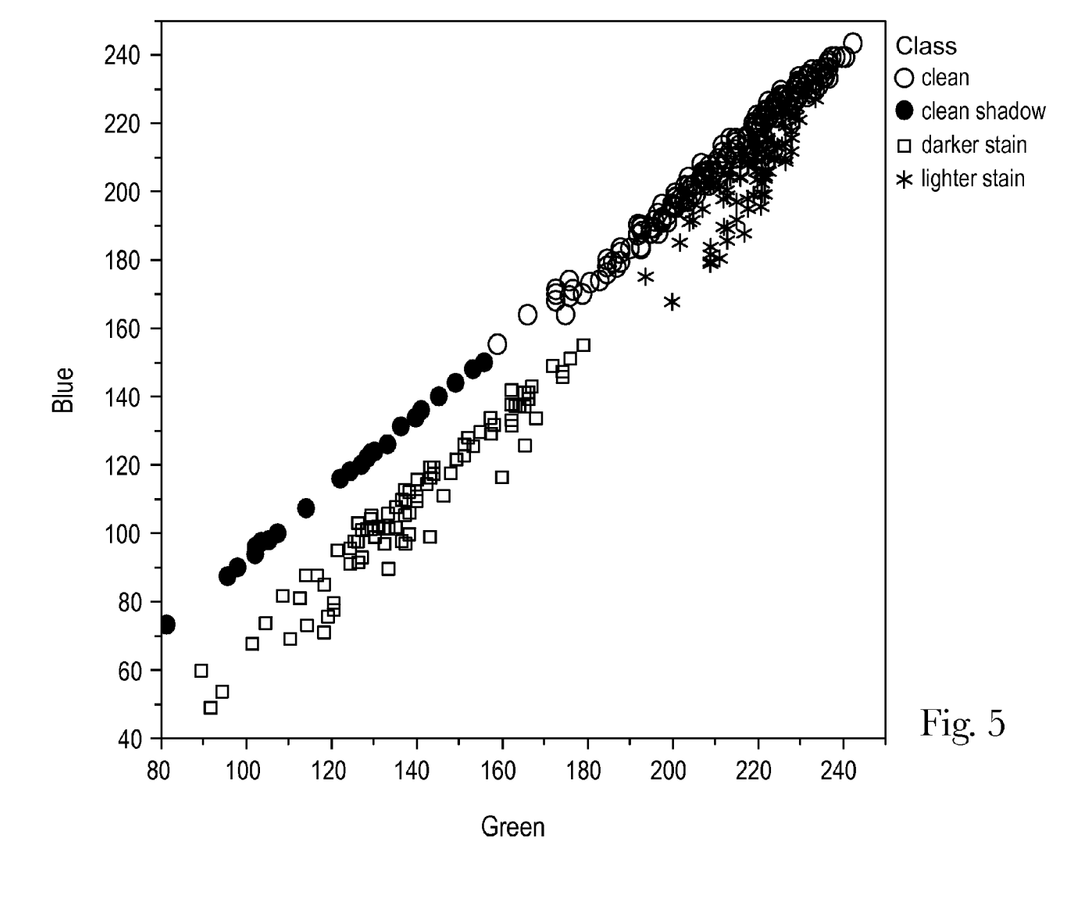
FIG. 5 is a chart showing one output of a color analysis.

RGB values can be obtained from the selected image points for visibly clean and stained portions of the underwear, e.g., FIG. 5 displays a scatterplot of the Blue vs. Green values of selected image points by category (i.e., stained and clean areas). For these types of measurements the RGB values tend to be highly correlated making analysis for category distinction relatively more challenging than another approach described below.

In an embodiment, the color-characterized pixels can be converted to L*a*b* values. Color charts under CIE illuminant standard D50 (or 5000K) relevant to the conditions of measurement can be used including white, near-white, greyscale, levels of yellowness, and brownish colors consistent with fecal staining on near white underwear. The color conversion can be performed for an image capture device using equations determined using statistical modeling such as $3^{rd}$ order multiple regression. In an embodiment, the color conversion from RGB (red, green, blue) to values of CIE L*, a*, and b* can be made by the equations shown below:

The model used color values from 589 images taken over the course of several days of the color charts containing 46 relevant color chips per image (R-Squared≥0.98).

TABLE 1

Conversion Equations from RGB to CIE L*a*b* Using Color Standards on Scanner

| Regression terms | L* coefficient | a* coefficient | b* coefficient |
|---|---|---|---|
| Intercept | −35.487 | 7.832 | 12.840 |
| red/100 | 26.593 | 53.222 | 32.072 |
| green/100 | 135.126 | −55.848 | −116.302 |
| blue/100 | −58.342 | 23.693 | 59.706 |
| (red/100)$^2$ | 64.296 | −368.676 | 153.368 |
| (green/100)$^2$ | 86.805 | −617.306 | 377.402 |
| (blue/100)$^2$ | −31.543 | 20.252 | 148.826 |
| (red/100)*(green/100) | −263.359 | 944.940 | −284.468 |
| (red/100)*(blue/100) | 109.283 | −168.241 | −52.746 |
| (green/100)*(blue/100) | 0 | 165.417 | −328.110 |
| (red/100)$^3$ | −13.834 | 95.771 | −35.949 |
| (green/100)$^3$ | −76.309 | 238.004 | −69.392 |
| (blue/100)$^3$ | 0 | 9.843 | −42.759 |
| (red/100)*(green/100)*(blue/100) | −98.869 | 150.998 | 116.427 |
| (red/100)$^2$*(green/100) | 60.519 | −155.772 | −16.572 |
| (red/100)$^2$*(blue/100) | −54.466 | 44.792 | 44.790 |
| (green/100)$^2$*(red/100) | 52.023 | −152.645 | 59.363 |
| (green/100)$^2$*(blue/100) | 129.770 | −206.381 | −98.859 |
| (blue/100)$^2$*(red/100) | 86.191 | −90.573 | −113.905 |
| (blue/100)$^2$*(green/100) | −78.786 | 71.545 | 154.248 |

For clarity, the cell values in Table 1 are the coefficients of the terms. By way of example, the equation for L* can be expressed in the following manner:

$$L^* = -35.487 + 26.593\, red/100 + 135.126\, green/100 - 58.342\, blue/100 + 64.296\, (red/100)^2 + 86.805\, (green/100)^2 - 31.543\, (blue/100)^2 - 263.359\, (red/100)*(green/100) + 109.283\, (red/100)*(blue/100) - 13.834\, (red/100)^3 - 76.309\, (green/100)^3 - 98.869\, (red/100)*(green/100)*(blue/100) + 60.519\, (red/100)^2*(green/100) - 54.466\, (red/100)^2*(blue/100) + 52.023\, (green/100)^2*(red/100) + 129.77\, (green/100)^2*(blue/100) + 86.191\, (blue/100)^2*(red/100) - 78.786\, (blue/100)^2*(green/100).$$

Note that in the equation above, each Red, Green, Blue value was divided by 100 before fitting into the complex $3^{rd}$ order polynomial regression model. This division by 100 helps make the coefficients numbers in the tens or hundreds with just 3 decimal places. While not necessary, dividing by 100 is a common way to handle the complicated terms of the equation to ensure that the coefficients to higher order terms don't become too small.

Figure 6:
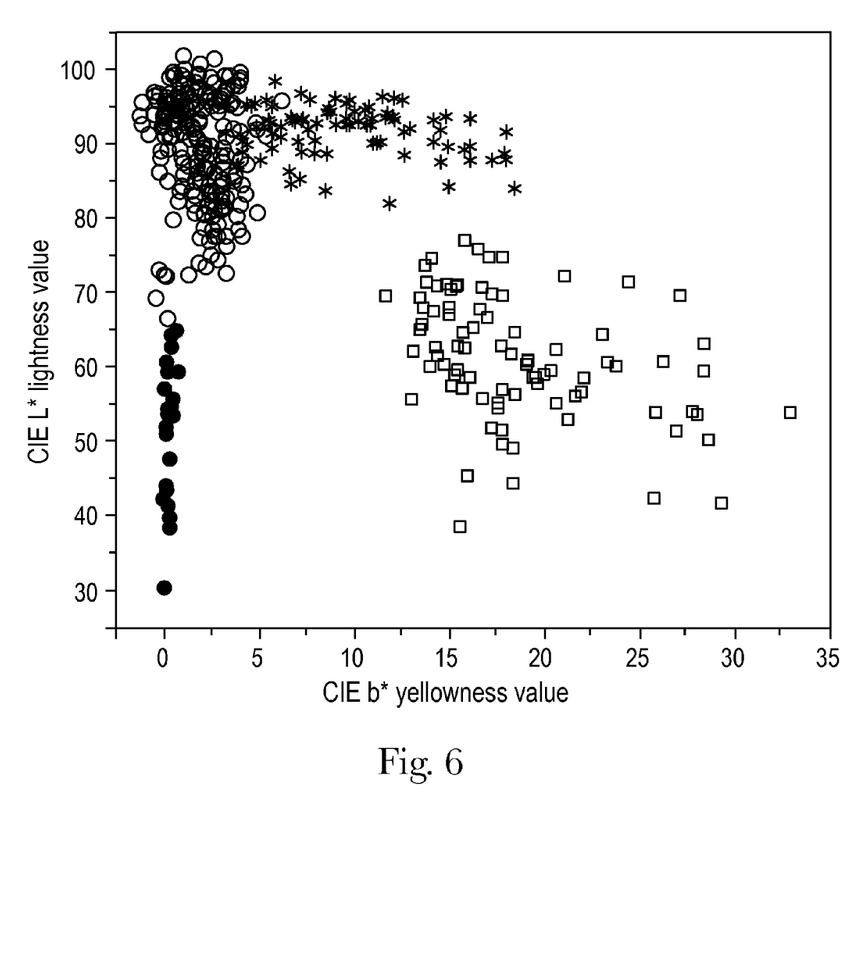
FIG. 6 is a chart showing an alternative output of a color analysis.
Figure 7:
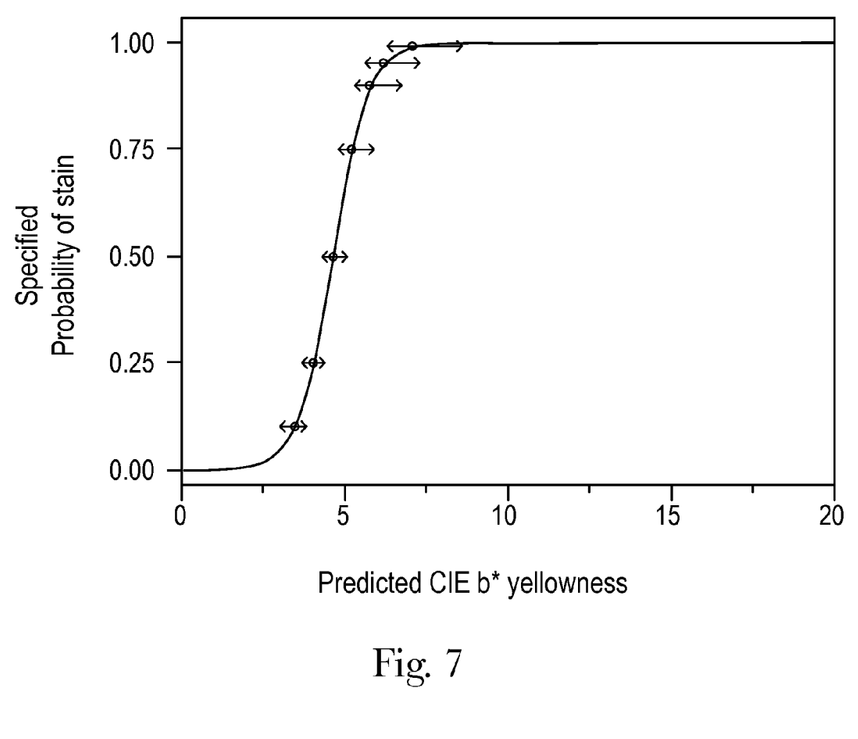
FIG. 7 is a graphical representation of the color analysis of a fecal matter stain.

FIG. 6 is a graphical representation of the relationship of selected image points as discussed with reference to FIG. 5, converted to their respective L* and b* vectors of the L*a*b* color system. In FIG. 6, the open circles represent clean areas, the closed circles represent gray areas resulting from fabric folds, the asterisks represent less intense stained areas, and the open squares represent more intense stained areas. As shown, colors associated with brown staining on underwear (open squares) are predominantly in the relatively mid to low L* range and the relatively high b* range. In the specific embodiment shown, for stained areas the b* values tend to begin in the about 5-7 range, and become more intense as b* increases. After the image is converted from RGB values to L*a*b* values, analysis software can be used to apply a discriminate rule, such as Quadratic Discriminant Analysis, or Fisher's Linear Discriminant Analysis, or Logistic Regression, or the like to classify, pixel by pixel, the category of every pixel of the image. One relatively simple example of how to do this is the following:

$$Ln(p/(1-p)) = -8.690(\pm SE\ 1.309) + 1.879(\pm SE\ 0.313)$$
$$CIE\ b^* yellowness,$$

where Ln is the natural log and p=the probability of a pixel being stain given the level of CIE b* yellowness (FIG. 7). In other words, $p=\exp(-8.690+1.879\ b^*)/(1+\exp(-8.690+1.879\ b^*))$ corresponds to the probability of stain given the level of b* yellowness. This dataset is based on N=410 pixels that were pre-identified by an expert grader as either stain or non-stain. For this relatively simple model, the Receiver Operator Characteristic curve of the true positive rate vs. false negative rate had an area under the curve of 0.995, indicating a high rate of correctly classifying a stain pixel as stain (true positive) and a low rate of incorrectly classifying a stain pixel as non-stain (false negative). More complex models using other techniques such as Quadratic Discriminant Analysis or logistic regression with additional categories or additional color values can be performed to further fine tune the identification of stain vs. non-stain or even darker stain vs. lighter stain. For example, the discriminating information for stain vs. non-stain using RGB data is contained within both the Green and Blue color variables (not just one by itself), so an effective model using the RGB color should potentially include both of these variables.

After the rule analysis is complete, the pixels of a predetermined color or colors, such as pixels having a b* value above a threshold can be determined, and/or graphed, as shown in FIG. 7. As shown in FIG. 7, in an embodiment, portions of the image corresponding to a b* value greater than about 7 have an extremely high probability of being associated with a stained area of the imaged garment. For different stains, different predictive components or values can be utilized. Once all the pixels having the predetermined color or colors, such as yellowness, are identified, the pixels can be counted, and then divided by pixels/cm$^2$ to arrive at an area of the image of fecal stain.

Also average b* value of the stain can be used as an intensity measure of the stain. For example, multiplying the area of the stain times the b* intensity provides a composite measure of area times intensity. Additional calculations of the image data can include pooling multiple subject's measurements at the pixel level and creating composite images colorized to depict a comparison between products or persons.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to this disclosure or that claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A method for determining the effective cleaning of bath tissue, the method comprising the steps of:
   a. providing at least one pair of worn underwear;
   b. optionally, cutting the pair of worn underwear and laying it flat with the inside surface exposed;
   c. scanning an image of the exposed, inside surface of the underwear, the image including at least a portion of the underwear likely to have fecal staining;
   d. capturing with the image at least one color standard;
   e. selecting image points in areas of the scanned image visually appearing clean and areas of the scanned image visually appearing stained with fecal staining;
   f. optionally, convert Red, Green, Blue (RGB) color to L*a*b* color;
   g. utilizing analysis software to characterize other areas of the scanned image corresponding to image points having similar color to the image points selected as clean or stained with fecal staining;
   h. classifying the image, pixel by pixel, into defined portions of the underwear that are clean or stained with fecal staining; and
   i. calculating areas corresponding to portions of the underwear stained with fecal staining.

2. The method of claim 1, wherein the scanning step is performed by one of a scanner, camera, and image capture device.

3. The method of claim 1, wherein the color standard is an RGB color chart.

4. The method of claim 1, wherein selected points are identified by location according to Cartesian coordinates and color according to RGB color.

5. The method of claim 1, wherein the software analysis for characterizing other areas of the scanned image uses one of Fisher's linear discriminant analysis, logistic regression, and quadratic discriminant analysis.

6. The method of claim 1, wherein the calculation of areas corresponding to portions of the underwear stained with fecal staining includes the steps of multiplying the number of pixels per unit area times the number of pixels characterized as being a color corresponding to a fecal matter stain.

7. The method of claim 1, wherein upon conversion to L*a*b* color values, the b* value is determined for said selected image points.

8. The method of claim 7, wherein the average b* value over an area corresponds to a measure of stain intensity.

9. The method of claim 1, wherein said classifying includes determining the number of pixels having a b* value greater than about 5.

10. The method of claim 9, wherein said calculating step includes multiplying the number of pixels having a b* value greater than about 5 by the area of each pixel.

* * * * *